June 29, 1948.                F. E. STYNLER                 2,444,383
              APPARATUS FOR DUSTLESS TREATING OF MATERIAL
                        Filed June 15, 1944
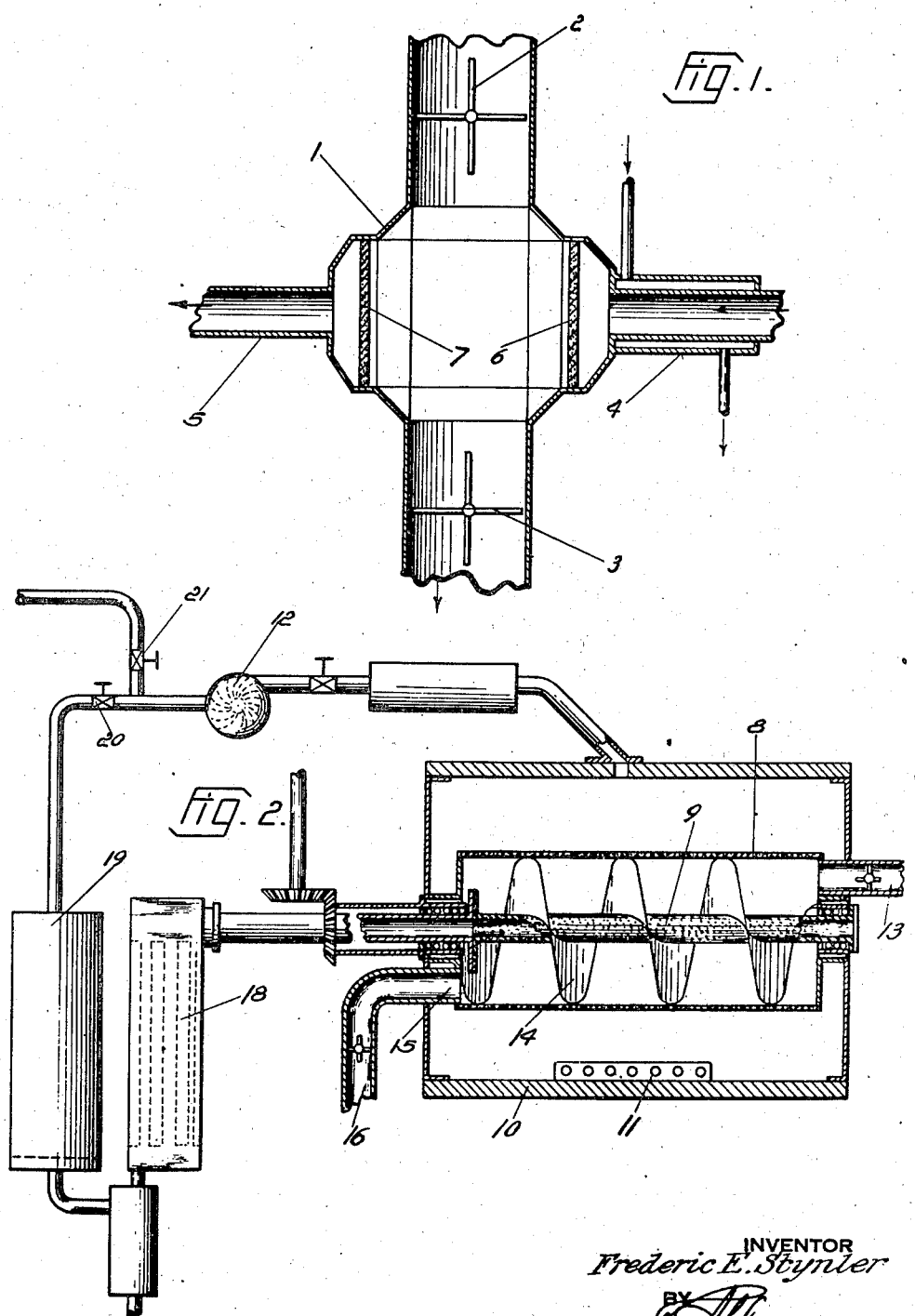
INVENTOR
Frederic E. Stynler
BY
ATTORNEY Patented June 29, 1948

2,444,383

UNITED STATES PATENT OFFICE 2,444,383

APPARATUS FOR DUSTLESS TREATING OF MATERIAL

Frederic E. Stynler, New York, N. Y.

Application June 15, 1944, Serial No. 540,381

2 Claims. (Cl. 34—182)

1

The object of the invention is a process and an apparatus for the dustless treating of solid materials with gases. The said process offers advantages, particularly in the drying of solid materials whose drying is accompanied with dust formation, and also in the drying of powdery materials, for example, in the drying of carbons of all types (decolorizing carbons, active carbons), sugar and similar materials. The drying of solid materials with a gaseous drying agent (such as air, flue gases, and similar gases) is almost always—as soon as the product reaches a certain degree of dryness—accompanied with dusting or the formation of dust and not only is the air in the drying room polluted by this dust but quite considerable losses in dry material result from this. In order to prevent this loss of dry material in air drying, in the known processes the air passing off from the drying apparatus has been passed through filters, dust collecting chambers, dust precipitating apparatus, etc. in order to catch the dust. Besides the fact that such installations are very costly and require careful control it has not been possible heretofore to overcome the disadvantages of the known processes.

The process which is the object of this invention overcomes all the disadvantages and defects accompanying the known processes in the evolution of dust. The process consists of subjecting the material to be dried, to drying between porous walls having a porosity such that even the finest dust cannot pass through. The invention is based on the discovery that porous walls having a porosity which allows the passage of gaseous drying agents, such as air or gases (for example, flue gases, or mixtures of gases, etc.) but which does not allow any dust to pass, even the finest dust, offer a means for preventing the gaseous drying agent from carrying even the finest particles with it through the wall.

According to the invention the process for a dustless treating of solid materials with gases is characterized by the fact that the solid material is subjected to the action of gases between porous walls having such a porosity that gases can pass through but dry solid material, even in the form of the finest dust, is held back, although the gas to whose action the solid material is subjected is sucked or forced under pressure through the material between the walls. Thus, in accordance with the invention, the material to be dried is subjected to drying between porous walls in such a manner that the gaseous drying agent (air, a gas or gas mixture) is sucked or forced by pressure through the material to be dried,

2 placed between the porous walls. The invention is further based on the discovery that calcined ceramic masses, such as, for example, unglazed clay, silica, stone ware, etc., already possess a porosity through which gases can pass readily but even the finest dust of dry material cannot pass through and is held back by a wall made of such material. Walls of ceramic materials with a porosity of 10 micron to 250 micron can be produced readily and such a porosity meets substantially all the practical requirements, but such walls can be made even with a smaller porosity if required for special cases.

The process according to the invention, makes it possible to use even flue gases and similar waste gases for drying of solid materials. The particles of dust and ash which are usually carried along by flue and waste gases are held back by one of the walls through which the gases are sucked or forced through under pressure—that is, by the outer wall with which it comes in contact first—and such particles are not introduced into the material to be dried.

Another object of the invention is also a drying apparatus which may be used with advantage for every material whose drying is accompanied with the formation of dust. A suitable form of construction of such an apparatus consists, in accordance with the invention, of two concentric porous pipes of different diameters, placed one inside the other, the inner and narrower of which, closed at one end, is connected with a source of suction or pressure and the outer, wider pipe is connected with a feeding device for introducing and a discharging device for removing the material which is subjected to drying between the two pipes, the pipes being of such a porosity that even the finest particles of dust cannot pass through. The outer pipe in such an apparatus may be constructed in any manner suitable for a dryer, for example, as a rotary dryer, and thus the advantages of the known dryers may also be applied to the process and apparatus according to the invention.

Two examples of construction of a drying apparatus for carrying out the process, in accordance with the invention, are shown schematically in the drawing.

The drying apparatus shown in Fig. 1 consists of a casing or housing 1 which is provided with a device 2 for introducing the material to be dried and with a device 3 for carrying off the dried material. The casing or case is provided with pipe fittings 4, 5, by which it may be connected to an air or gas pipe conduit so that air or a gas may be sucked through the housing 1, by means of a suction fan (not shown in the drawing), for example, in the direction of the arrow by means of a fan attached to the pipe fitting 5. At the points where the drying air or gas enters the casing or housing 1 and where it passes out, porous walls 6, 7 are arranged within the casing so that the air or gas sucked in by the fan can enter the housing and leave it only through these walls. The porous walls are, for example, made of calcined ceramic material and have such a pore size that although air and gas can pass through, not even the finest dust can pass through it. The material to be dried, introduced by the feeding device 2, is exposed to the air or gas current sucked through the housing, on its passage to the discharge device 3 and on its way is dried and the dry material leaves the discharge device 3 without any dust formation.

The drying apparatus shown in Fig. 2 consists of two concentric pipes 8 and 9 of unglazed calcined clay or silica, or similar material, arranged one inside the other. The two pipes are arranged inside of a closed casing or housing 10, equipped with a suitable heating unit, for example, one provided with steam heating or with an electric heater 11, so that any desired temperature, favorable to the drying process, may be established and maintained in the housing. The inner pipe 9 closed at one end, is connected at its open end with a suction apparatus, for example, a fan 12, which sucks in the gases (air, flue gas, etc.) filling the housing 10 into the outer pipe 8 and through the outer pipe into the inner pipe 9. The material to be dried is introduced into the outer pipe 8, closed at both ends and connected with a feeding device which introduces the material to be dried into the said pipe continuously or intermittently, for example, through pipe 13. The pipe 8 may be constructed in a manner suitable for a dryer, for example as a rotary dryer. In the example shown in the drawing, the outer pipe 8 is provided with a rotatably mounted conveyer, for example a screw conveyer 14 which conveys the material introduced into the outer pipe toward the discharge opening 15 provided at the other end of the pipe, from which the material is discharged through the pipe 16. The gas (air, etc.) which fills the chamber or the casing 10 is sucked in through the porous outer pipe 8 into the porous inner pipe 9 and on its way it passes over and through the material introduced between the two pipes 8 and 9 thus drying the material.

The drying gases are heated to the desired temperature on passing through the oven 10 in which the pipes 8, 9 are arranged and thus are maintained at a temperature favorable for the process.

The gas sucked off through pipe 9 is laden with water vapor. It is therefore desirable to let these gases pass through a condenser 18 arranged in the suction line at a suitable place, in which the water vapors are condensed, thus enabling the passing of the gas through the apparatus in repeated cycles. For this purpose, however, it is also desirable to arrange a drying tower 19 behind the condenser that is after the water has been condensed. When the process is carried out with gas as a circulating drying agent, it is only necessary to arrange cocks or valves 20, 21 into the piping, whereby on opening valve 20 and closing valve 21 the drying agent may be circulated repeatedly through the apparatus.

Owing to the vacuum or reduced pressure under which the process is carried out, the drying gases pass through the material to be dried at a high speed and, consequently, the time of drying is reduced.

In many cases a vacuum of half an inch of mercury is sufficient for achieving the desired effect. Because of the slight vacuum required by this process, fans are particularly suitable for the process.

In the process according to the invention, the drying process and the drying time is influenced not only, as heretofore, by the temperature and the time to which the material is subjected to drying but also by the velocity with which the drying gases are forced through the material to be dried. The drying process may be regulated in any desired manner by increasing or reducing the velocity with which the drying gases pass through the material to be dried, and the time of drying may be considerably reduced by making use of a suitable velocity of the drying gases and applying the maximum drying temperature.

By the use of gases such as carbonic acid, etc., combustible material may be dried and this even at a temperature which is above the ignition temperature of the material and thereby another means is afforded for reducing the drying time.

In most cases an ordinary fan suffices for obtaining the desired vacuum and for giving the gases the desired velocity, suitable for the drying. The required and suitable temperature for the drying process can be reached either by preheating the drying gases to a correspondingly high temperature, or the casing 10 in which the pipes 8, 9 are built in, may be heated.

The screw conveyer 7 by the movement of the material carried by it will prevent the settling of dust on the inner pipe 2 and thereby will also prevent the clogging of the pores and thus will maintain the efficiency of the apparatus for an unlimited time.

I claim:

1. Drying apparatus for the dustless treating of solid material consisting of a casing, two pipes of porous material and of different diameters arranged in said casing, one within the other, the inner pipe being closed at one end and connected at the other end to a suction device for sucking in the gases filling the casing through the outer pipe and into the inner pipe, said outer pipe being closed at both ends and connected by means of opening and closing devices at one end to a feeding device and at the other end to a discharge device for the material to be treated, the discharge of gases from the outer pipe being prevented by the said opening and closing devices, said devices being opened only when material is being fed or discharged.

2. Apparatus of the character described comprising in combination a suction device, a hollow casing communicating with one end of said suction device, a tubular member arranged in said casing, an inlet for solid material at one end of said tubular member and an outlet for said material, said tubular member being formed of porous material of such porosity that permits gases to seep therethrough but prevents escape of solid material and a pipe formed of material similar to said tubular member arranged in said tubular member, one end of said pipe being closed and its other end being operatively connected to the other end of the suction device and a screw conveyor on the pipe for moving the solid material through said tubular member.

FREDERIC E. STYNLER.

(References on following page)

REFERENCES CITED

The following references are of record in the file of this patent:

UNITED STATES PATENTS

| Number | Name | Date |
|---|---|---|
| 90,847 | Johnson et al. | June 1, 1869 |
| 394,618 | Schindler | Dec. 18, 1888 |
| 660,900 | Haskell | Oct. 30, 1900 |
| 958,822 | Prinz | May 24, 1910 |
| 964,342 | Velilla | July 12, 1910 |
| 2,172,059 | Chilton | Sept. 5, 1939 |
| 2,220,193 | Ahlmann | Nov. 5, 1940 |
| 2,336,378 | Uhlig | Dec. 7, 1943 |

FOREIGN PATENTS

| Number | Country | Date |
|---|---|---|
| 426,729 | Germany | Mar. 16, 1926 |
| 661,229 | France | Mar. 4, 1929 |